(12) United States Patent
Fluck et al.

(10) Patent No.: US 7,889,922 B2
(45) Date of Patent: Feb. 15, 2011

(54) METHOD AND SYSTEM FOR HISTOGRAM CALCULATION USING A GRAPHICS PROCESSING UNIT

(75) Inventors: Oliver Fluck, Plainsboro, NJ (US);
Shmuel Aharon, West Windsor, NJ (US); Mikael Rousson, Trenton, NJ (US); Daniel Cremers, Bonn (DE)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1105 days.

(21) Appl. No.: 11/594,460

(22) Filed: Nov. 8, 2006

(65) Prior Publication Data

US 2007/0127814 A1 Jun. 7, 2007

Related U.S. Application Data

(60) Provisional application No. 60/736,449, filed on Nov. 14, 2005.

(51) Int. Cl.
G06K 9/00 (2006.01)
G06F 17/00 (2006.01)
G06F 15/80 (2006.01)
G06T 1/00 (2006.01)
G06T 1/60 (2006.01)

(52) U.S. Cl. ........................ 382/168; 345/418; 345/505; 345/530

(58) Field of Classification Search .................. 382/168, 382/169; 345/505, 582
See application file for complete search history.

(56) References Cited

U.S. PATENT DOCUMENTS 7,609,884 B1 * 10/2009 Stalling et al. .............. 382/168
2005/0271302 A1 * 12/2005 Khamene et al. ............ 382/294

OTHER PUBLICATIONS

Jens Krüger, Rüdiger Westermann, "Linear algebra operators for GPU implementation of numerical algorithms", ACM Transactions on Graphics (TOG), v.22 n. 3, Jul. 2003.*
Mark Harris, "Mapping computational concepts to GPUs", International Conference on Computer Graphics and Interactive Techniques archive, ACM SIGGRAPH 2005 Courses, 2005, Los Angeles, California, Jul. 31-Aug. 4, 2005.*
Edwige E. Pissaloux, Patrick Bonnin, On the adequacy of image processing algorithms and massively parallel computers, pp. 282-294, 1994.
Duclos P, Boeri F, Auguin M, Giraudon G, Image processing on a SIMD/SPMD Architecture :OPSILA pp. 430-433, 1988.
Pun-Mo Ho, Tien-Tsin Wong, Chi-Sing Leung, Compressing the Illumination-Adjustable Images with Principal Component Analysis, pp. 355-364, 2005.
Thompson, CJ, Sahngyun Hahn, Oskin, M., Using modern graphics architectures for general-purpose computing: a framework and analysis, IEEE Xplore, 2002.

* cited by examiner

*Primary Examiner*—Samir A Ahmed
*Assistant Examiner*—Li Liu
(74) *Attorney, Agent, or Firm*—Donald B. Paschburg

(57) ABSTRACT

A method for histogram calculation using a graphics processing unit (GPU), comprises storing image data in a two-dimensional (2D) texture domain; subdividing the domain into independent regions or tiles; calculating in parallel, in a GPU, a plurality of tile histograms, one for each tile; and summing up in parallel, in the GPU, the tile histograms so as to derive a final image histogram.

26 Claims, 3 Drawing Sheets

METHOD AND SYSTEM FOR HISTOGRAM CALCULATION USING A GRAPHICS PROCESSING UNIT

CROSS-REFERENCE TO RELATED APPLICATION AND CLAIM OF PRIORITY

Specific reference is hereby made to copending U.S. Provisional Patent Application No. 60/736,449 filed Nov. 14, 2005, in the names of inventors OLIVER FLUCK, SHMUEL AHARON, MIKAEL ROUSSON, and DANIEL CREMERS, and entitled GPU Based Image Histogram Calculation, and whereof the disclosure is hereby incorporated herein by reference and whereof the benefit of priority is claimed.

FIELD OF THE INVENTION

The present invention relates to the field of image processing and, more particularly, to the field of histogram calculation.

BACKGROUND OF THE INVENTION

Due to the immense computational power of present-day graphics processors (GPU), general purpose computation on GPU's has become a very active area of research and development. The performance of algorithms running on GPU's depends very much on how well they can be arranged to fit and exploit the processors' single instruction multiple data (SIMD) architecture. Many tasks that are considered simple to perform on a central processing unit (CPU) such as grouping and counting of values of a domain for statistical purposes pose considerable challenges for implementation on a GPU. See Kevin Bjorke: Color Controls, GPU Gems, Addison-Wesley, 2004, Chapters 22 and 24.

BRIEF SUMMARY OF THE INVENTION

An algorithm in accordance with the present invention enables computing histograms on graphics cards. Histograms are a key factor in the understanding, interpretation, and processing of digital images. They are used for various purposes, including the analysis of the range and distribution of values in an image. While GPU's are widely used at the present time to process and visualize images at interactive rates and image processing algorithms for color correction and filtering have been successfully implemented on GPU's, a practical way to calculated a histogram entirely on a GPU appears to have remained elusive.

Accordingly, a histogram generally has to be calculated on the CPU and be transferred to the GPU. Because of the limited transfer bandwidth typically available, transferring data between GPU and CPU is a costly operation. Generally, applications only benefit from GPU performance if they can run entirely on graphics hardware.

In accordance with an aspect of the invention, a method for histogram calculation using a graphics processing unit (GPU), comprises: storing image data in a two-dimensional (2D) texture domain; subdividing the domain into independent regions or tiles; calculating in parallel, in a GPU, a plurality of tile histograms, one for each tile; and summing up in parallel, in the GPU, the tile histograms so as to derive a final image histogram.

In accordance with another aspect of the invention, the step of subdividing the domain comprises subdividing the domain into even sized and independent regions.

In accordance with another aspect of the invention, the step of calculating a plurality of tile histograms comprises: counting intensity in a texel determined by texel texture coordinates, the number of histogram bins, and the size of the image data.

In accordance with another aspect of the invention, the step of calculating a plurality of tile histograms comprises: determining for each texel a corresponding bin by using texture coordinates.

In accordance with another aspect of the invention, the step of calculating a plurality of tile histograms comprises: counting for each texel the occurrence of values inside its appurtenant tile for the corresponding histogram bin.

In accordance with another aspect of the invention, the step of determining for each texel a corresponding bin by using texture coordinates comprises: determining the same corresponding bin for each texel having the same given position in its respective appurtenant tile.

In accordance with another aspect of the invention, the step of summing up in parallel comprises: applying a tile wise texture reduce operation.

In accordance with another aspect of the invention, the step of applying a texture reduce operation comprises carrying out a rendering pass for halving texture size.

In accordance with another aspect of the invention, the step of carrying out a rendering pass for halving texture size comprises summing the ith texel of a given histogram with the ith texel of the three tiles adjacent in a positive texture coordinate direction.

In accordance with another aspect of the invention, the step of storing image data comprises using at least one of RGB and RGBA texture.

In accordance with another aspect of the invention, the step of storing image data comprises using at least one of Luminance (c=1), RGB (c=3) and RGBA (c=4) texture such that a histogram of n bins results in a square tile size of sqrt(n/c)× sqrt(n/c) texels, where c is the number of channels per texel.

In accordance with another aspect of the invention, a method for histogram calculation using a graphics processing unit (GPU), comprises storing image data in a two-dimensional (2D) texture domain; subdividing the domain into independent regions or tiles by subdividing the domain into evenly sized and independent tiles; calculating in parallel, in a GPU, a plurality of tile histograms, one for each tile and determining for each texel a corresponding bin by using texture coordinates by counting for each texel the occurrence of values inside its appurtenant tile for the corresponding histogram bin; summing up in parallel, in the GPU, the tile histograms so as to derive a final image histogram, by applying a texture reduce operation by carrying out a rendering pass for halving texture size by summing the ith texel of a given histogram with the ith texel of the three tiles adjacent in a positive texture coordinate direction.

In accordance with another aspect of the invention, a method for histogram calculation using a graphics processing unit (GPU), comprises: storing input data in a two-dimensional (2D) texture domain; subdividing the domain into evenly sized sections; deriving, in parallel in the GPU, a set of histograms comprising a histogram for each of the sections; and summing the set of histograms to derive a final histogram.

In accordance with another aspect of the invention, a method for image histogram calculation using a graphics processing unit (GPU), comprises: storing image input data in a two-dimensional (2D) texture domain; subdividing the domain into evenly sized sections; deriving, in parallel in the GPU, a set of image histograms comprising a histogram for each of the sections; and summing the set of image histograms to derive a final histogram.

In accordance with another aspect of the invention, the step of deriving a set of image histograms comprises: determining for each texel a corresponding bin.

In accordance with another aspect of the invention, the step of deriving a set of image histograms comprises: determining for each texel a corresponding bin by using texture coordinates.

In accordance with another aspect of the invention, the step of applying a texture reduce operation comprises: carrying out a rendering pass for halving texture size.

In accordance with another aspect of the invention, the step of carrying out a rendering pass for halving texture size comprises: summing the ith texel of a given histogram is summed up with the ith texel of the three tiles adjacent in a positive texture coordinate direction.

In accordance with another aspect of the invention, the step of deriving a set of histograms comprises: applying a texture reduce operation.

In accordance with another aspect of the invention, the step of applying a texture reduce operation comprises: summing in each texel of an appurtenant tile all counts within the appurtenant tile corresponding to the corresponding bin determined for the each texel so as to obtain a combined image histogram.

In accordance with another aspect of the invention, the step of applying a texture reduce operation comprises: repeating steps of the texture reduce operation so as to obtain a final image histogram.

In accordance with another aspect of the invention the step of applying a texture reduce operation comprises: summing in each texel of an appurtenant tile all counts within the appurtenant tile corresponding to the corresponding bin determined for the each texel; and summing the set of histograms to derive a final image histogram.

In accordance with another aspect of the invention, a system for histogram calculation using a graphics processing unit (GPU), comprises: a memory device for storing a program and other data; and a processor device in communication with the memory device, the processor being operative with the program to perform: storing image data in a two-dimensional (2D) texture domain; subdividing the domain into independent regions or tiles; calculating in parallel, in a GPU, a plurality of tile histograms, one for each tile; and summing up in parallel, in the GPU, the tile histograms so as to derive a final image histogram.

In accordance with another aspect of the invention, the processor is operative with the program to perform: subdividing the domain into even sized and independent regions.

In accordance with another aspect of the invention, the processor is operative with the program to perform: counting intensity in a texel determined by texel texture coordinates, the number of histogram bins, and the size of the image data.

In accordance with another aspect of the invention, a computer program product comprises a computer useable medium having computer program logic recorded thereon for program code for histogram calculation using a graphics processing unit (GPU), by: storing image data in a two-dimensional (2D) texture domain; subdividing the domain into independent regions or tiles; calculating in parallel, in a GPU, a plurality of tile histograms, one for each tile; and summing up in parallel, in the GPU, the tile histograms so as to derive a final image histogram.

In accordance with another aspect of the invention, a method for histogram calculation using a graphics processing unit (GPU), comprises storing image data in a two-dimensional (2D) texture domain; subdividing the domain into independent regions or tiles; calculating in parallel, in a GPU, a plurality of tile histograms, one for each tile; and summing up in parallel, in the GPU, the tile histograms so as to derive a final image histogram.

BRIEF DESCRIPTION OF THE SEVERAL VIEWS OF THE DRAWING

The invention will be more fully understood from the detailed description following, in conjunction with the Drawing, in which.

DETAILED DESCRIPTION OF THE INVENTION

Figure 1:
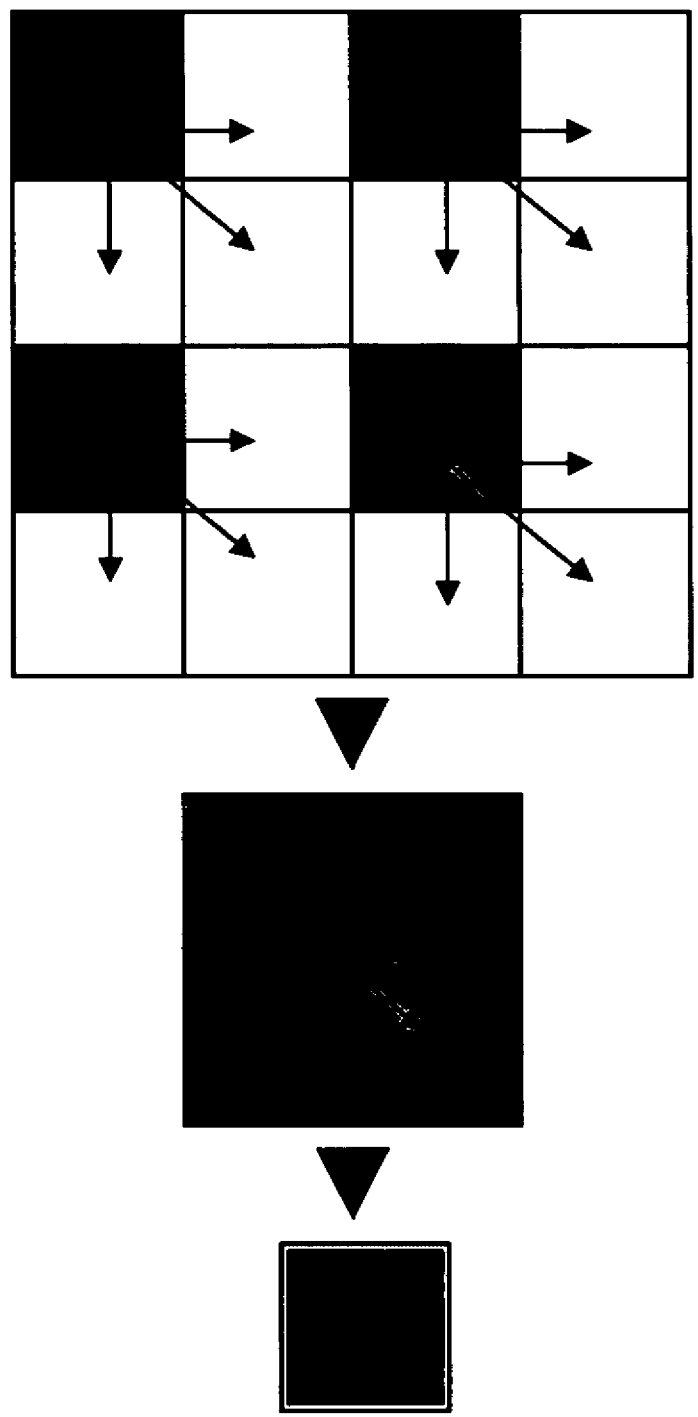
FIG. 1 shows in diagrammatic mode steps in accordance with principles of the present invention.

In accordance with principles of the present invention, a method is herein disclosed for computing histograms in shader programs, typically in a GPU, as will be hereinafter described by way of exemplary embodiments.

An image histogram is a representation of the image intensities distribution by means of rectangles, also called bins, whereof the widths represent class intervals and whose areas are proportional to the corresponding image intensity frequencies.

The histogram is typically created by counting distinctive image intensities into respective bins. While this is a relatively trivial task to implement on a CPU, the streaming architecture of present-day graphics processing units makes this a difficult task. A reason for this is that the GPU does not allow one to write into memory locations that are determined by their input value. That is, it is not possible to check the image intensity at a given pixel, determine the bin to which it should be added to and then add it to that bin. In addition, due to performance reasons, it is not possible to minimize the input values to the corresponding number of bins and sample the entire image for every bin in the fragment shader in the GPU.

In graphics a fragment shader is typically used to determine the color values of pixels of an image by computing color (Red Green Blue), transparency (Alpha) and (in 3D graphics) depth values of fragments.

Principles for an embodiment in accordance with the present invention comprise the following: the input data is stored in a 2D texture with power of two dimensions and the domain is subdivided into evenly sized and independent regions, (also referred to as sections, or "tiles"). The tile size depends on the histogram granularity. By using typical values Luminance (c=1), RGB (c=3) or RGBA (c=4) texture, a histogram of n bins leads to a square tile size of sqrt(n/c)×sqrt(n/c) texture elements or "texels", where c is number of channels per texel. The number of tiles equals the input texture size divided by the size of the tiles. One histogram is created for each section, and then the section histograms are all summed up into a final image histogram. The intensity, or intensities, counted in a texel are determined by its texture coordinates and the number of histogram bins.

Using this scheme, a plurality of local histograms are computed in parallel. Each texel of a tile counts the occurrence of values inside its appurtenant tile for a particular histogram interval or bin. The corresponding bin is determined using texture coordinates. Thus, after a single pass of n/4 texture fetches per texel, every tile represents a local distribution of values in its region. To obtain a global distribution of values inside a domain, all tiles are combined to a single global histogram. Tiles are summed up by applying a texture reduce operation in a fashion similar to that presented in *Jens Krüger and Rüdiger Westermann: Linear Algebra Operators for GPU Implementation of Numerical Algorithms ACM SIG-GRAPH,* 2003, whereof the disclosure is hereby incorporated herein to the extent it is not incompatible with the present invention.

FIG. 1 shows an appropriate texture reduce operation where the arrows show the directions of finding a value of a particular histogram interval or bin.

Figure 2:
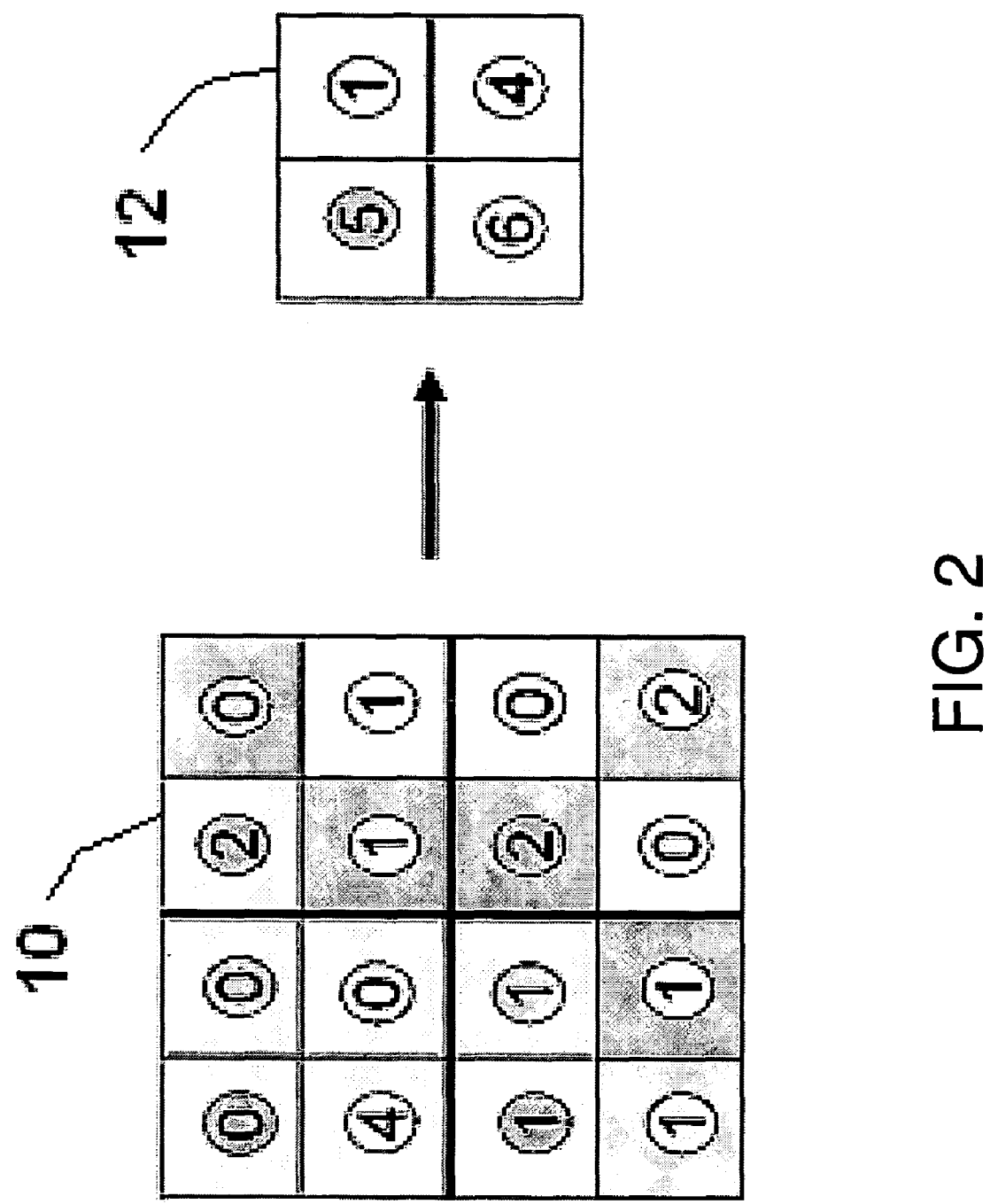
FIG. 2 shows in diagrammatic mode related steps in accordance with principles of the present invention.

FIG. 2 shows a schematic illustration of steps of a suitable texture reduce operation from texture 10 to texture 12. The occurrence of a value inside a tile is counted and shown as a circled number in one particular texel of each tile. The colors in the circles identify texels relating to a common value of histogram interval. The tiles are summed up to a global histogram by applying a texture reduce operation. For example, in FIG. 2, the count in the upper left-hand texel of each tile is summed for all for 4 tiles in the grouping 10, giving 0+2+1+2=5. The count of 5 is then placed in the upper left-hand texel position of the tile of the next stage 12, and so forth for each of the remaining three texels of each remaining tile. In the next step, one tile is achieved. The box colors in FIG. 2 are just to symbolize that the texels have various values.

During each rendering pass, the texture size in each dimension is halved. The ith texel of a local histogram is summed up with the ith texel of the three tiles adjacent in a positive texture coordinate direction. This way, all m×m tiles of a domain are combined to a final histogram after log(m) passes. Thus the number of costly image lookups per input value is minimized.

Table 1 shows applicable definitions for an exemplary embodiment in accordance with principles of the present invention.

TABLE 1

| Number of histogram bins: | N | |
|---|---|---|
| Number of channels per texel: | C | |
| Image size: | s × s | |
| Histogram texture size: | h × h | $h = \sqrt{n/c}$ |
| Number of image sections/histograms: | m × m | m = s/h |
| Intensity: | I | |
| Bandwidth of intensities of image: | $b_i$ | |
| Bandwidth of intensities counted in one texel: | $b_x$ | $b_x = b_i/(h \times h)$ |
| Bandwidth of intensities counted in one channel: | $b_c$ | $b_c = b_x/c$ |
| Origin of section (or tile): | $O_x, O_y$ | |

Using these definitions, we have:

The intensity counted in a texel/channel is determined by its texture coordinates (x, y):

$$I = (\text{floor}(y/h)*h + \text{floor}(x/h))*b_x$$

To perform the counting, every texel in a tile or section is sampled during every fragment program execution inside the section. The position relative to the origin of a section is determined by texture coordinates:

$$O_x = \text{floor}(x/h)*h$$

$$O_y = \text{floor}(y/h)*h$$

After the m×m histograms are created in one buffer of size s×s, they are summed up to one single histogram texture of size h×h. As noted above, the summation is realized by performing a so-called reduce operation as shown graphically and schematically in FIGS. 1 and 2. The reduce operation is performed in a tile wise manner, comparable to the texel wise reduce operation presented in the aforementioned publication by Krüger and Westermann.

In an exemplary embodiment in accordance with principles of the present invention, the entire calculation is performed on the GPU using either the DirectX or OpenGL API's (Application Programming Interface). The image data and the histogram are saved on the GPU using textures. The calculations are then performed by rendering a square primitive into the result texture and performing the calculation in a fragment program. The flow of the calculation can be controlled by using different textures as input/output and loading different fragment programs.

Figure 3:
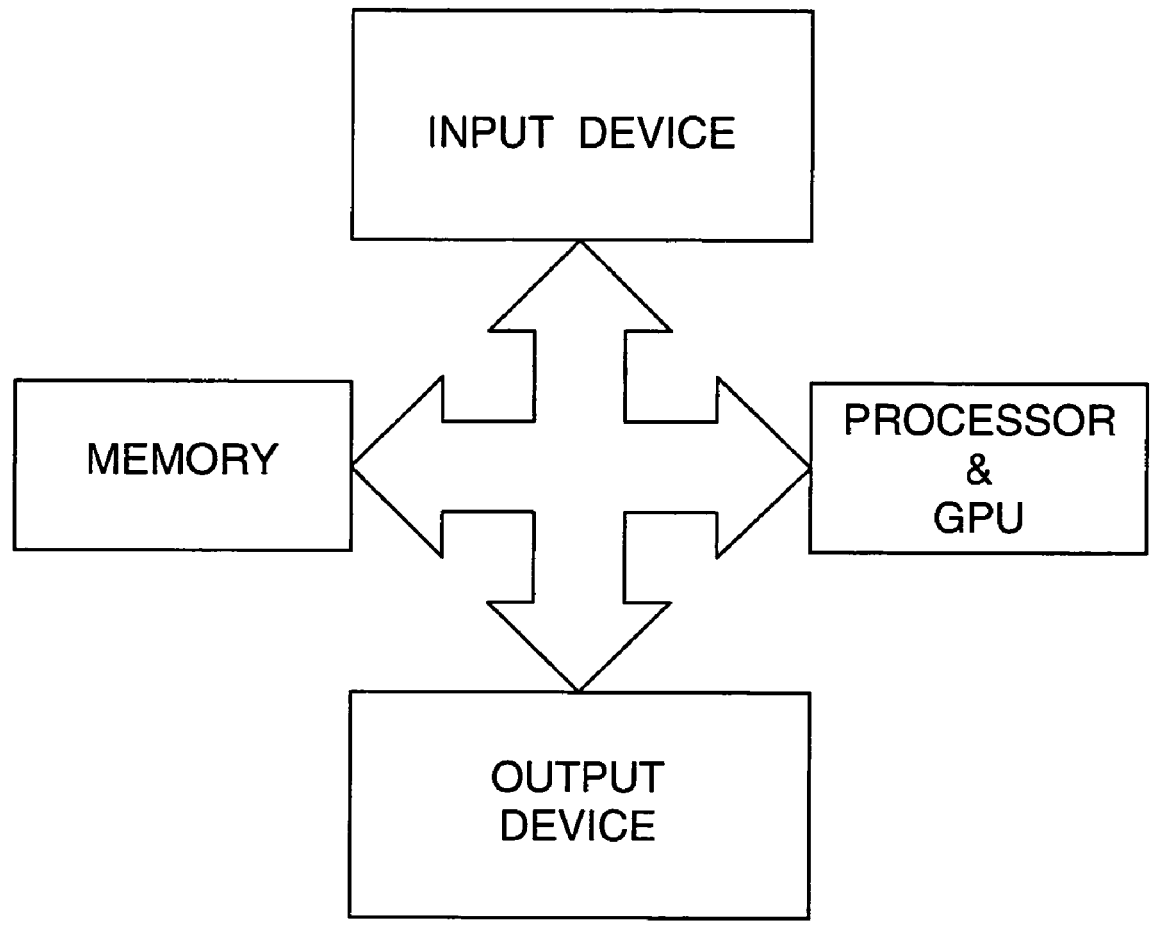
FIG. 3 shows in basic schematic form a digital processor coupled for two way data communication with an input device, an output device, a GPU, and a memory device for storing a program and other data as may be typically used in an embodiment of the present invention.

As will be apparent, the present invention is best intended to be implemented with the use and application of image source equipment in conjunction with a programmed digital computer. FIG. 3 shows in basic schematic form a digital processor coupled for two way data communication with an input device, an output device, a graphics card, and a memory device for storing a program and other data. The input device is so designated in broad terms as a device for providing an appropriate image or images for processing in accordance with the present invention.

For example, the input may be applied directly, or by way of storage, from an imaging device, such as a camera, a device incorporated in a CATSCAN, X-ray machine, an MRI or other device, or a stored image, or by communication with another computer or device by way of direct connection, a modulated infrared beam, radio, land line, facsimile, or satellite as, for example, by way of the World Wide Web or Internet, or any other appropriate source of such data.

The output device may include a computer type display device using any suitable apparatus such as a cathode-ray kinescope tube, a plasma display, liquid crystal display, and so forth, or it may or may not include a device for rendering an image and may include a memory device or part of the memory device of FIG. 3 for storing an image for further processing, or for viewing, or evaluation, as may be convenient, or it may utilize a connection or coupling including such as are noted above in relation to the input device. The processor is operative with a program set up in accordance with the present invention for implementing steps of the invention. Such a programmed computer may interface readily through communications media such as land line, radio, the Internet, and so forth for image data acquisition and transmission.

The invention may be readily implemented, at least in part, in a software memory device and packaged in that form as a software product. This can be in the form of a computer program product comprising a computer useable medium having computer program logic recorded thereon for program code for performing the method of the present invention.

The present invention has also been explained in part by way of examples using illustrative exemplary embodiments. It will be understood that the description by way of exemplary embodiments is not intended to be limiting and that, while the present invention is broadly applicable, it is helpful to also illustrate its principles, without loss of generality, by way of exemplary embodiments. It is noted, for example, that application of the present invention extends also to processing non-image datasets.

It will also be understood that various changes and substitutions not necessarily herein explicitly described may be made by one of skill in the art to which it pertains. Such changes and substitutions may be made without departing from the spirit and scope of the invention which is defined by the claims following.

What is claimed is:

1. A method for histogram calculation using a graphics processing unit (GPU), comprising:
   storing image data in a two-dimensional (2D) texture domain;
   subdividing said domain into independent regions or tiles;
   calculating in parallel, entirely within said GPU, a plurality of tile histograms, one for each tile;
   summing up in parallel, entirely within said GPU, said tile histograms so as to derive a final image histogram; and, wherein
   said step of calculating a plurality of tile histograms comprises:
   counting intensity in a texel determined by texel texture coordinates, the number of histogram bins, and the size of said image data.

2. A method for histogram calculation as recited in claim 1, wherein
   said step of calculating a plurality of tile histograms comprises:
   determining for each texel a corresponding bin by using texture coordinates.

3. A method for histogram calculation as recited in claim 2, wherein
   said step of determining for each texel a corresponding bin by using texture coordinates comprises:
   determining the same corresponding bin for each texel having the same given position in its respective appurtenant tile.

4. A method for histogram calculation as recited in claim 1, wherein
   said step of calculating a plurality of tile histograms comprises:
   counting for each texel the occurrence of values inside its appurtenant tile for said corresponding histogram bin.

5. A method for histogram calculation as recited in claim 1, wherein said step of summing up in parallel comprises:
   applying a tile wise texture reduce operation.

6. A method for histogram calculation as recited in claim 5, wherein said step of applying a texture reduce operation comprises:
   carrying out a rendering pass for halving texture size.

7. A method for histogram calculation as recited in claim 6, wherein said step of carrying out a rendering pass for halving texture size comprises:
   summing the ith texel of a given histogram with the ith texel of the three tiles adjacent in a positive texture coordinate direction.

8. A method for histogram calculation as recited in claim 1, wherein:
   said step of storing image data comprises using at east one of RGB and RGBA texture.

9. A method for histogram calculation as recited in claim 1, wherein:
   said step of storing image data comprises using at least one of Luminance (c=1), RGB (c=3) or and RGBA (c=4) texture such that a histogram of n bins results in a square tile size of sqrt(n/c) x sqrt(n/c) texels, where c is number of channels per texel.

10. A method for histogram calculation using a graphics processing unit (GPU), comprising:
    storing input data in a two-dimensional (2D) texture domain;
    subdividing said domain into evenly sized sections;
    deriving, in parallel entirely within said GPU, a set of histograms comprising a histogram for each of said sections;
    summing said set of histograms entirely within said GPU to derive a final histogram; and
    wherein said step of deriving a set of histograms comprises:
    determining for each texel a corresponding bin by using texture coordinates.

11. A method for histogram calculation as recited in claim 10, wherein said step of deriving a set of histograms comprises:
    applying a texture reduce operation.

12. A method for histogram calculation as recited in claim 11, wherein said step of applying a texture reduce operation comprises:
    summing in each texel of an appurtenant tile all counts within said appurtenant tile corresponding to said corresponding bin determined for said each texel so as to obtain a combined histogram.

13. A method for histogram calculation as recited in claim 12, wherein said step of applying a texture reduce operation comprises:
    repeating steps of said texture reduce operation so as to obtain a final histogram.

14. A method for histogram calculation as recited in claim 13, wherein said step of applying a texture reduce operation comprises:
    summing in each texel of an appurtenant tile all counts within said appurtenant tile corresponding to said corresponding bin determined for said each texel; and
    summing said set of histograms to derive a final histogram.

15. A method for histogram calculation as recited in claim 14, wherein said step of applying a texture reduce operation comprises:
    carrying out a rendering pass for halving texture size.

16. A method for histogram calculation as recited in claim 15, wherein said step of carrying out a rendering pass for halving texture size comprises:
    summing the ith texel of a given histogram is summed up with the ith texel of the three tiles adjacent in a positive texture coordinate direction.

17. A method for image histogram calculation, using a graphics processing unit (GPU), comprising:
    storing image input data in a two-dimensional (2D) texture domain;
    subdividing said domain into evenly sized sections;
    deriving, in parallel entirely within said GPU, a set of image histograms comprising a histogram for each of said sections;
    summing said set of image histograms entirely within said GPU to derive a final histogram; and
    wherein said step of deriving a set of image histograms comprises:
    determining for each texel a corresponding bin by using texture coordinates.

18. A method for image histogram calculation as recited in claim 17, wherein said step of applying a texture reduce operation comprises:

carrying out a rendering pass for halving texture size.

19. A method for image histogram calculation as recited in claim 18, wherein said step of carrying out a rendering pass for halving texture size comprises:

summing the ith texel of a given histogram is summed up with the ith texel of the three tiles adjacent in a positive texture coordinate direction.

20. A method for image histogram calculation as recited in claim 19, wherein said step of deriving a set of histograms comprises:

applying a texture reduce operation.

21. A method for image histogram calculation as recited in claim 20, wherein said step of applying a texture reduce operation comprises:

summing in each texel of an appurtenant tile all counts within said appurtenant tile corresponding to said corresponding bin determined for said each texel so as to obtain a combined image histogram.

22. A method for image histogram calculation as recited in claim 21, wherein said step of applying a texture reduce operation comprises:

repeating steps of said texture reduce operation so as to obtain a final image histogram.

23. A method for image histogram calculation as recited in claim 22, wherein said step of applying a texture reduce operation comprises:

summing in each texel of an appurtenant tile all counts within said appurtenant tile corresponding to said corresponding bin determined for said each texel; and summing said set of histograms to derive a final image histogram.

24. A method for histogram calculation using a graphics processing unit (GPU), comprising:

storing image data in a two-dimensional (2D) texture domain;

subdividing said domain into independent regions or tiles by subdividing said domain into evenly sized and independent tiles;

calculating in parallel, in said GPU, a plurality of tile histograms, one for each tile and determining for each texel a corresponding bin by using texture coordinates by counting for each texel the occurrence of values inside its appurtenant tile for said corresponding histogram bin; and summing up in parallel, in said GPU, said tile histograms so as to derive a final image histogram, by applying a texture reduce operation by carrying out a rendering pass for halving texture size by summing the ith texel of a given histogram with the ith texel of the three tiles adjacent in a positive texture coordinate direction.

25. A system for histogram calculation using a graphics processing unit (GPU), comprising:

memory means for storing a program and other data; and processor means in communication with said memory device, said processor being operative with said program to perform:

storing image data in a two-dimensional (2D) texture domain;

subdividing said domain into independent regions or tiles;

calculating in parallel, entirely within said GPU, a plurality of tile histograms, one for each tile;

summing up in parallel entirely within said GPU, said tile histograms so as to derive a final image histogram; and wherein said processor means is operative with said program to perform counting intensity in a texel determined by texel texture coordinates, the number of histogram bins, and the size of said image data.

26. A computer program product comprising a computer useable medium having computer program logic recorded thereon for program code for histogram calculation using a graphics processing unit (GPU), by:

storing image data in a two-dimensional (2D) texture domain;

subdividing said domain into independent regions or tiles;

calculating in parallel, entirely within said GPU, a plurality of tile histograms, one for each tile;

summing up in parallel, entirely within said GPU, said tile histograms so as to derive a final image histogram; and wherein:

said step of calculating a plurality of tile histograms comprises:

counting intensity in a texel determined by texel texture coordinates, the number of histogram bins, and the size of said image data.

* * * * *